United States Patent [19]

Root et al.

[11] 4,227,258
[45] Oct. 7, 1980

[54] HOUSING FOR A HAND HELD TRANSMITTER-RECEIVER

[75] Inventors: James A. Root, Orlando; Arleigh B. Baker, Longwood, both of Fla.

[73] Assignee: SCOPE Incorporated, Reston, Va.

[21] Appl. No.: 4,493

[22] Filed: Jan. 18, 1979

[51] Int. Cl.² .............................................. H04B 1/08
[52] U.S. Cl. .................................. 455/348; 455/351; 455/89; 455/90; 361/422
[58] Field of Search ............... 325/352, 353, 355, 356, 325/357, 361, 111, 118, 119, 15, 16; 361/422, 424

[56] References Cited

U.S. PATENT DOCUMENTS

| 2,984,740 | 5/1961 | Madland | 325/16 |
| 3,728,664 | 4/1973 | Hurst | 325/16 |
| 4,081,751 | 3/1978 | Maddaloni | 325/352 |

FOREIGN PATENT DOCUMENTS 2702129  7/1978  Fed. Rep. of Germany ............ 325/16

OTHER PUBLICATIONS

Wilson, T-4602 MX, Hand Held Portable Two Way FM Radio, Jun. 22, 1977.
Motorola, Handie-Talkie Portable Radiophones, Jul., 1955.

Primary Examiner—Robert L. Griffin
Assistant Examiner—Tommy P. Chin
Attorney, Agent, or Firm—John E. Benoit

[57] ABSTRACT

A portable housing is shown for containing and protecting a hand held radio transmitter-receiver and a relatively large power supply, such housing being of three molded basic sections with a handle attached thereto, the radio being removable from said housing.

5 Claims, 5 Drawing Figures

HOUSING FOR A HAND HELD TRANSMITTER-RECEIVER

This invention relates generally to portable radio transmitter-receiver equipment, and more particularly to a portable housing designed to carry a hand held portable transmitter-receiver and a battery power supply.

BACKGROUND OF THE INVENTION

Hand held transmitter-receivers are in common usage today, particularly in the field of police activity, fire activity and various utility activities. These transmitter-receivers are normally designed with a detachable rechargeable battery. Due to the inherent size limitations relative to anything that is to be hand held, these batteries have an operating limit of from about 6 to 8 hours. There have been requirements in the past wherein such a limitation as to battery size is too restrictive for the particular usage desired. Such situations are expanding, and the need for longer life batteries for use with a portable transmitter is increasing. One manner in which this need has been answered is to simply build a substantial, large housing which integrates therein a transmitter-receiver and large size batteries having lives of several days or even weeks. The manufacture of these devices is expensive, and requires a new production line since all of the elements therein differ basically from the housings for hand held portables. Accordingly, any company that wishes to use both of these items must supply themselves with two entirely separate and distinct portable radio transmitter-receivers.

The present invention provides a housing which contains and shields a hand held portable radio transmitter-receiver with the normal rechargeable battery removed therefrom. This housing is designed so as to also carry a battery or batteries which provide extended life usage so that the transmitter-receiver may be used over an extended period of time without the requirement of recharging the batteries. Additionally, there is provided a means wherein the hand held portable transmitter-receiver is also shielded so that it is protected from damage. Accordingly, any damage is usually sustained by the housing itself rather than the radio. In such cases, the housing is easily exchanged and the same radio may be replaced in the new housing. Since the housing in the present invention is easily constructed of molded parts, it, in itself, is not expensive. As a result, the present invention provides a unique supplementary portable system for use with standard hand held portable radio-transceivers.

These advantages and objects of the present invention will become apparent from the following description when taken in conjunction with the various figures of the drawings.

DETAILED DESCRIPTION OF A PREFERRED EMBODIMENT OF THE INVENTION

Figure 1:
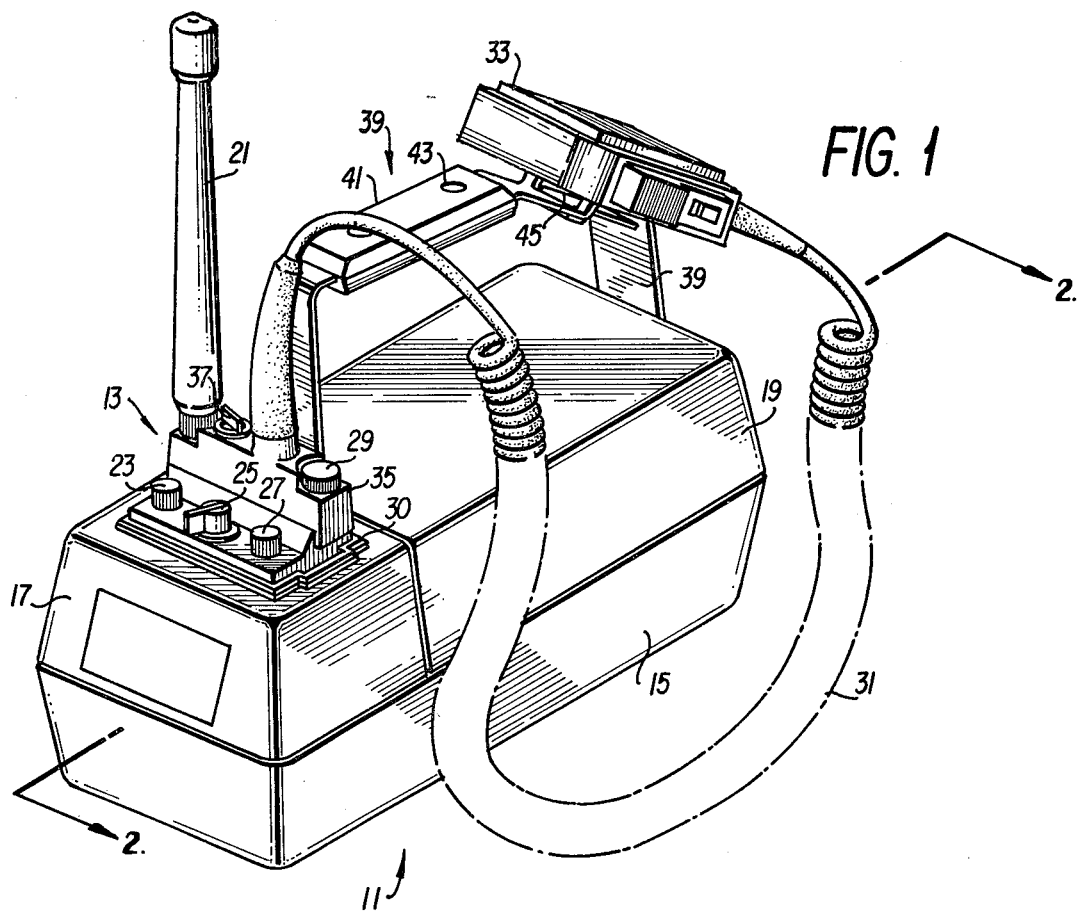
FIG. 1 is a perspective view of the housing of the present invention as it is assembled with a portable hand held radio transceiver contained therein.
Figure 2:
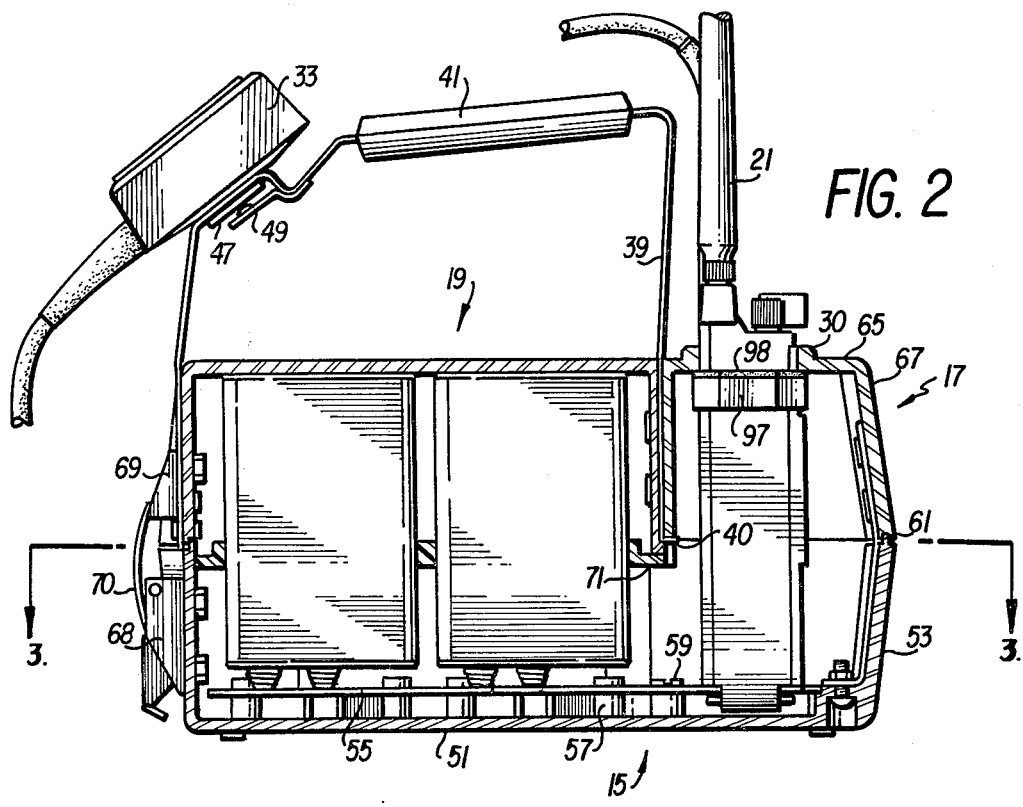
FIG. 2 is a cross-section taken through lines 2—2 of FIG. 1.

Turning now more particularly to the drawings, there is shown in FIGS. 1 and 2, housing 11 of the present invention with the hand held portable radio-receiver 13 in place. The housing 11 has three basic sections illustrated as the base 15, radio shield 17 and battery cover 19, all of which relate to the hand held radio 13 and hold and shield same while it is in use.

Radio 13 has a standard antenna 21, on/off control and volume knob 23, channel selector 25 and squelch knob 27. In this particular transmitter-receiver, the upper section or cap 35, including antenna 21 and cable 31, is removeably mounted on the radio itself when it is desired to have an attached mircophone such as microphone speaker 33 directly secured to the radio itself. Cap 35 is secured to the radio by means of a screw type knurled knob 29. Removal of cap 35, antenna 21 and cable 31, permits use of the radio separately from the battery housing. A flange 30 maintains the radio within the shield 17 as is more clearly evident from the sectional view as shown in FIG. 2. There is further provided in this particular unit, a cap 37 covering a connecton which may be used for a remote antenna when the radio transmitter is used in a mobile state as in an automobile.

The housing 11 is carried by means of a handle 39 which terminates at one end in a lip 40 designed to pass through an aperture in a part of the shield 17 so as to be secured at one end thereof within the housing 11. A grip 41 is secured to the handle by means such as rivets 43 so as to provide a comfortable hand holding device. A slot 45 is provided in a section of the handle and is adapted to receive the protruding clip 47 on the speaker 33 so that it may be carried in a secure position when not actually in use. There is also shown a spring bracket 49 which is mounted in the handle and which resiliently bears against the bottom of the clip 47 so as to assure that the speaker will be retained in the slot 45.

Base 15 has a bottom section 51 and an upwardly extending circumferential wall 53. A printed circuit board 55 is mounted within the base 15 and is held in place by means of a screw 59. The standard type of battery which is proposed to be used in the housing as shown has spring type terminals which mate with the printed circuit described in detail hereinafter. The upper edge of the upwardly extending wall 53 terminates in a flange 61 for mating purposes.

Figure 3:
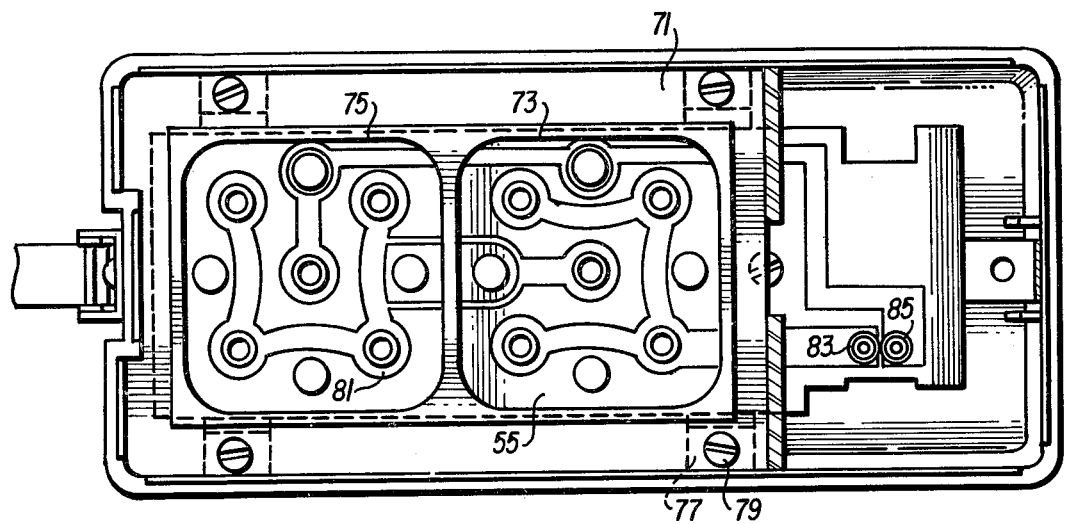
FIG. 3 is a partially sectionalized plan view of the base and shield of the housing of the present invention.
Figure 4:
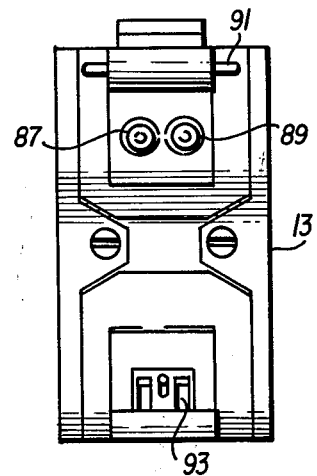
FIG. 4 is a bottom view of the particular hand held radio illustrated in FIG. 1.
Figure 5:
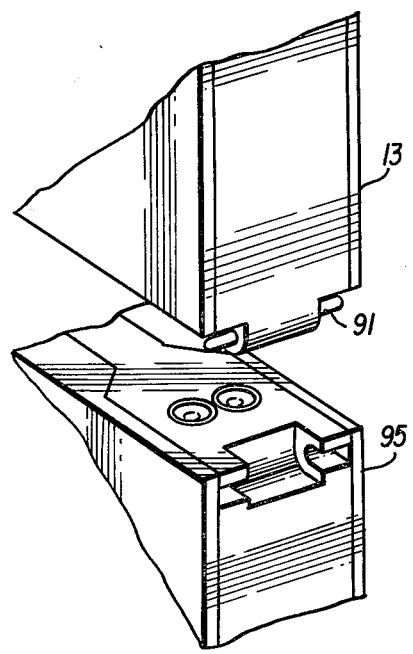
FIG. 5 is a partial view illustrating how the hand held radio is used with a standard rechargeable battery.

The top of shield 17 comprises an upper surface 65 with a downwardly depending circumferential wall 67. This wall terminates in a groove which mates with the flange 61 about the forward part of the wall 53. Integral with the shield 17 and extending rearwardly within the base 15 is a shelf 71 having apertures 73 and 75 therein as more clearly shown in FIG. 3. These apertures are designed to be of a geometrical size so as to encompass the batteries and firmly hold them in a position so that they will not slide about within the housing. Four posts 77, which are integral with the base 15, extend upwardly therefrom and are provided with bore holes whereby the shelf 71 may be secured to the base by means such as screws 79. As can be seen clearly in FIG. 3, a circuit is printed on the board 55 which, by its configuration, prevents the placing of the battery in either one of the apertures in any position such that a short circuit will occur. The positive/negative terminals extend into the base of the shield 19 and terminate in contacts 83 and 85. These contacts mate with the contacts 87 and 89 of the hand held portable radio shown in FIG. 4. Accordingly, the terminals of the radio mate with the terminals of the housing and allow the power to be supplied by the batteries to the radio. FIG. 5 illustrates the use of radio 13 with a small battery 95 when the radio is not used with housing 11.

The radio is mounted by removing the cap 35 from the transceiver 13 which is then placed within the shield 17 with a sleeve 97 and associated gasket 98 placed on the top thereof. The aperture in the housing 11 is slightly smaller than the sleeve 97 but is of a size sufficient to accept the cap 35. Accordingly, after the transceiver 13 is in place and the cap is secured to the top of the receiver unit, the radio is held securely in place and shielded by the housing itself. The battery cover 19 also includes a depending circumferential wall which is of a size sufficient that three sides thereof mate with the configuration of the base edge as indicated in FIG. 2. The forward end of the terminating wall has a lip similar to the handle and fits within the aperture of the wall 67 of the shield 17. When securing this cover, the lip is placed within the aperture and the case is swung downwardly from the rear so as to mate as shown. The battery cover is held in place by a standard locking device comprising a lower section 68 and an upper section 69 and a latch 70. Upper section 69 also secures the rear end of handle 39 to the battery cover. As will be obvious, the housing is manufactured of three basic sections which may be molded and may be inexpensively produced, including the printed circuitry therein. The entire device is easily assembled so as to enclose the hand held portable radio as described hereinabove. If the housing should be damaged, it is easily replaceable. It is quite obvious that any damage will almost certainly occur to the housing rather to the shielded portable radio transmitter. Accordingly, there has been provided by this invention an auxiliary unit which may be used with a standard hand held portable transmitter-receiver without basically changing any parts of that unit.

Although the invention has been described relative to a specific hand held radio transmitter, such housing could be produced to fit the requirements of any hand held receiver which may be used by any one company without changing or altering the invention itself. Accordingly, the invention is to be limited only by the scope of the following claims.

I claim:

1. A housing for a hand held transmitter-receiver and associated power supply comprising
   a base having a peripheral upwardly extending wall;
   shield means having a top and a peripheral subtending wall, said subtending wall removably mating with a portion of said upwardly extending wall;
   an aperture through said top of said shield means for accepting and retaining said hand held transmitter-receiver;
   a plate extending from a section of said subtending wall substantially perpendicular to said upwardly extending wall within the remaining portion of said wall;
   at least one aperture in said plate for retaining said power supply;
   plural electrical contacts within said base below said aperture in said shield means, said contacts being located so as to mate with contacts on said hand held transmitter-receiver;
   circuit means within said base for connecting said contacts to said power supply;
   a cover having a top, subtending side walls and one subtending end wall, said subtending side walls and end wall mating with the remaining portion of said upwardly extending wall; and
   means for removably securing said base, said shield, said plate and said cover together.

2. The housing of claim 1 further comprising a removable handle attached to said housing.

3. A housing for a hand held transmitter-receiver and associated power supply comprising
   a base;
   shield means having a top and a peripheral subtending wall removably mating with and extending above a portion of said base;
   an aperture through said top of said shield means for accepting and retaining said transmitter-receiver;
   cover means mating with said shield means and the remaining portion of said base so as to provide said housing;
   a plate extending from said shield means within said housing;
   at least one aperture in said plate for retaining a power supply; and
   circuit means within said housing for connecting said power supply to said transmitter-receiver.

4. The housing of claim 3 wherein said circuit means comprises
   a printed circuit.

5. The housing of claim 3 further comprising a removable handle attached to said housing.

* * * * *